Sept. 27, 1932.  L. GOLDHAMMER  1,879,188
FILM DOOR FOR MOTION PICTURE APPARATUS
Filed April 25, 1929

Patented Sept. 27, 1932

1,879,188

UNITED STATES PATENT OFFICE

LEO GOLDHAMMER, OF MUNICH, GERMANY, ASSIGNOR TO AGFA ANSCO CORPORATION OF BINGHAMTON, NEW YORK, A CORPORATION OF NEW YORK

FILM DOOR FOR MOTION PICTURE APPARATUS

Application filed April 25, 1929, Serial No. 358,063, and in Germany May 2, 1928.

The present invention relates to a film gate for motion picture apparatus, more particularly a film gate providing a broad space between the film gate in its open position and the film guide.

In order to provide a broad space between the opened film gate and the film guide, the film gate is not pivotally mounted immediately near the film guide but at a substantial distance therefrom. In its length it is divided by a hinge in such a manner that the length of that link (intermediate link) of the gate, being pivotally connected with the carrying plate of the apparatus, corresponds with the distance between the pivot of the gate and the film guide. This arrangement has the result that the gate after being opened is displaced some distance from the aperture plate and the film can be easily inserted. The film-guideway and the film-carrying plate are thus entirely free and can be easily cleaned.

The film gate is advantageously secured in its operating position by a spring operating on the intermediate link. If a notch formed in the upper end of the door is caused to engage a pin secured to the carrying plate the film gate is locked in its operative position by means of its spring-controlled link.

My device has some advantages over the known film gates providing a broad space between the film gate in its open position and the film guide in that it is of a simpler construction, requiring a very small space within the motion picture apparatus and disturbing in no way the insertion of the film.

One form of construction of my invention is illustrated in the annexed drawing, in which:—

Figure 1:
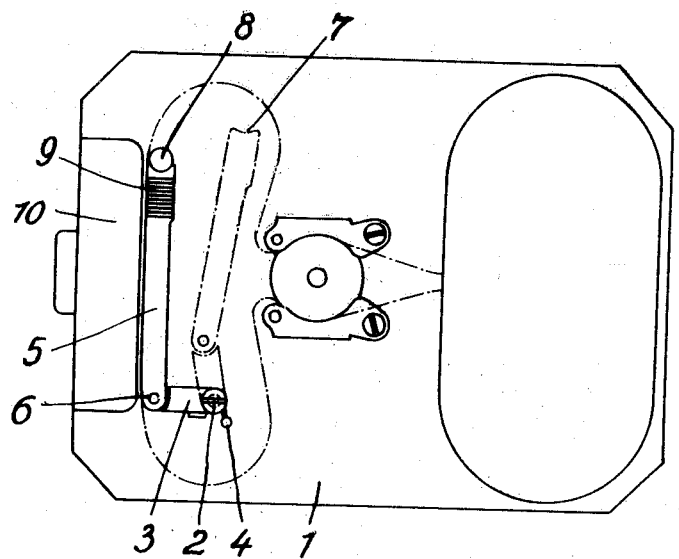
Figure 2:
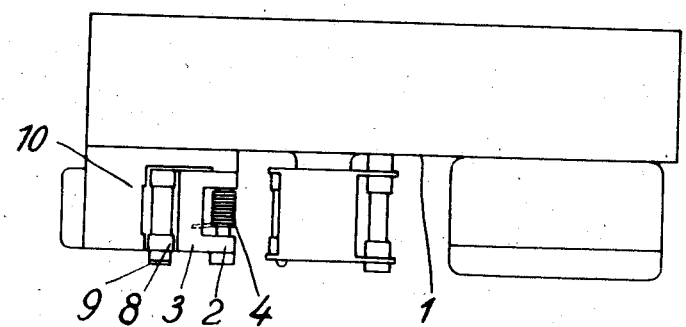

Fig. 1 is a side view, and
Fig. 2 is a plan view of the apparatus.

The intermediate link 3 rotatable about the axle 2 is mounted on the operating plate 1. The link 3 is pressed upwards by means of a spring 4. The film gate 5 is connected at its lower end 6 to the link 3. The upper end of the gate engages, by means of the notch 7, a pin 8 secured to the plate 1 and locks the gate in its operative position.

In order to open the gate 5 it is drawn downwards by means of the gripping member 9 and then moved rearwardly (as shown in dot-dash lines). In this position the gate 5 and the link 3 are displaced so far from the film guide 10 that the film can be easily inserted.

I claim:

1. In a motion picture apparatus in operative combination a side plate carrying the aperture plate and the film guide, a film gate, a link hinged to the film gate, said link being pivotally connected with the side plate at a substantial lateral distance from the said film guide and corresponding in its length to the distance between its pivot and the film guide, a spring acting on the pivoted link hinged to the film gate and securing the film gate in its operative position by causing a notch formed in the upper end of the gate to engage a pin secured to the side plate.

2. In a motion picture apparatus in operative combination a side plate carrying the aperture plate and the film guide, a film gate and a link hinged to the lower end of said film gate, said link being pivotally connected with the side plate at a substantial lateral distance from the film guide and corresponding in its length to the distance between its pivot and the film guide.

3. In a motion picture apparatus in operative combination a side plate carrying the aperture plate and the film guide, a film gate, a link hinged to the lower end of said film gate, said link being pivotally connected with the side plate at a substantial lateral distance from the film guide and corresponding in its length to the distance between its pivot and the film guide, a spring acting on the pivoted link hinged to the film gate and securing the film gate in its operative position by causing a notch formed in the upper end of the gate to engage a pin secured to the side plate.

4. In a motion picture apparatus in operative combination a side plate carrying the aperture plate and the film guide, a film gate and a link hinged to the film gate, said link being pivotally connected with the side plate at a substantial lateral distance from the film guide and corresponding in its length to the distance between its pivot and the film guide.

In testimony whereof, I affix my signature.
LEO GOLDHAMMER.